United States Patent
Lee et al.

(10) Patent No.: US 10,592,055 B2
(45) Date of Patent: Mar. 17, 2020

(54) TOUCH SENSING APPARATUS, TOUCH PANEL, AND DISPLAY APPARATUS INCLUDING THE SAME

(71) Applicant: Samsung Display Co., Ltd., Yongin-si (KR)

(72) Inventors: Dong-Hoon Lee, Hwaseong-si (KR); Byung Sun Kim, Suwon-si (KR); Jeong Kyoo Kim, Seoul (KR); Sun Haeng Cho, Hwaseong-si (KR); Yong Won Jo, Seoul (KR); Jae Hyung Cho, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/871,285

(22) Filed: Jan. 15, 2018

(65) Prior Publication Data

US 2019/0102002 A1   Apr. 4, 2019

(30) Foreign Application Priority Data

Sep. 29, 2017   (KR) .......................... 10-2017-0128165

(51) Int. Cl.
*G06F 3/044* (2006.01)
*G06F 3/041* (2006.01)
*G06F 3/045* (2006.01)

(52) U.S. Cl.
CPC .............. *G06F 3/044* (2013.01); *G06F 3/045* (2013.01); *G06F 3/0412* (2013.01); *G06F 3/0418* (2013.01); *G06F 2203/04111* (2013.01); *G06F 2203/04112* (2013.01); *G09G 2310/0264* (2013.01)

(58) Field of Classification Search
None
See application file for complete search history.

(56) References Cited

U.S. PATENT DOCUMENTS

| 8,536,880 | B2 | 9/2013 | Philipp |
| 2010/0079401 | A1 | 4/2010 | Staton |
| 2013/0257785 | A1* | 10/2013 | Brown .................... G06F 3/044 345/174 |
| 2017/0108991 | A1 | 4/2017 | Noh |

FOREIGN PATENT DOCUMENTS

| KR | 10-2016-0119294 | 10/2016 |
| KR | 10-2017-0045432 | 4/2017 |

* cited by examiner

*Primary Examiner* — Nicholas J Lee
(74) *Attorney, Agent, or Firm* — H.C. Park & Associates, PLC

(57) ABSTRACT

A touch sensing apparatus including: a touch panel including a first electrode and a second electrode; a driver configured to apply a driving signal to the first electrode; a touch sensor configured to receive a signal transferred depending on the driving signal from the second electrode, and to convert and output the signal as a sensing signal; and a touch controller configured to detect the sensing signal. The touch panel further includes a third electrode and a fourth electrode which transfer noise signals having different magnitudes to the touch sensor, and the touch sensor outputs the sensing signal by using a difference in the noise signals and the signal.

18 Claims, 8 Drawing Sheets

TOUCH SENSING APPARATUS, TOUCH PANEL, AND DISPLAY APPARATUS INCLUDING THE SAME

CROSS-REFERENCE TO RELATED APPLICATION

This application claims priority from and the benefit of Korean Patent Application No. 10-2017-0128165, filed on Sep. 29, 2017, which is hereby incorporated by reference for all purposes as if fully set forth herein.

BACKGROUND

Field

Exemplary embodiments of the invention relate to a touch sensing apparatus, a touch panel, and, more specifically, to a display device including the same.

Discussion of the Background

A display device may include a touch sensing function which can interact with a user in addition to a function of displaying an image. A touch sensing function is used to determine contact information, such as whether an object approaches or contacts a screen, a contact position thereof, and the like by sensing a change in pressure, charges, light, and the like which are applied to the screen by the display device, when a user writes text or draws a figure by approaching or contacting the screen with a finger or a touch pen. The display device may receive an image signal based on the contact information to display an image.

This touch sensing function may be implemented through a touch sensing apparatus. The touch sensing apparatus may be classified into various types, such as a resistive type, a capacitive type, an electro-magnetic (EM) type, and an optical type.

Among the various types of touch sensing apparatuses, the capacitive touch sensing apparatus includes a sensing capacitor formed of a plurality of sensing electrodes capable of transferring a sensing signal, and senses a change in capacitance of the touch sensing apparatus generated when a conductor, such as a finger, approaches the touch sensor to determine existence of a touch, a touch position, and the like. The capacitive touch sensing apparatus includes a plurality of touch electrodes disposed in a touch sensing region and signal transferring wires connected with the touch electrodes. The signal transferring wires may transfer sensing input signals to the touch electrodes, or may transfer sensing output signals of the touch electrodes generated depending on touches.

The above information disclosed in this Background section is only for understanding of the background of the inventive concepts, and, therefore, it may contain information that does not constitute prior art.

SUMMARY

Exemplary embodiments of the invention provide a touch sensing apparatus for sensing a touch input in spite of charge retransmission to a touch electrode when the touch input is performed.

Exemplary embodiments of the invention also provide a touch sensing apparatus for sensing a touch input even when a charge is transferred from another touch electrode during a multi-touch event.

Additional features of the inventive concepts will be set forth in the description which follows, and in part will be apparent from the description, or may be learned by practice of the inventive concepts.

An exemplary embodiment of the invention discloses a touch sensing apparatus including: a touch panel including a first electrode and a second electrode; a driver configured to apply a driving signal to the first electrode; a touch sensor configured to receive a signal transferred depending on the driving signal from the second electrode, and to convert and output the signal as a sensing signal; and a touch controller configured to detect the sensing signal. The touch panel further includes a third electrode and a fourth electrode which transfer noise signals having different magnitudes to the touch sensor, and the touch sensor outputs the sensing signal by using a difference in the noise signals and the signal.

The touch sensor may include: a first integrator having an input terminal connected with the second electrode; a first subtractor having input terminals connected with the third electrode and the fourth electrode, respectively; a second integrator having an input terminal connected with an output terminal of the first subtractor; a second subtractor having input terminals connected with an output terminal of the first integrator and an output terminal of the second integrator, respectively; and an analog-to-digital converter (ADC) connected with an output terminal of the second subtractor.

The first subtractor may amplify a difference between the magnitudes of the noise signals to output the noise signals.

An amplification factor for amplifying the difference between the magnitudes of the noise signals may be determined depending on an area of the second electrode, an area of the third electrode, and an area of the fourth electrode.

A different input terminal of the first integrator may be connected with the third electrode or the fourth electrode.

The touch sensor may include: a first integrator having an input terminal connected with the second electrode; a second integrator having an input terminal connected with the third electrode; a third integrator having an input terminal connected with the fourth electrode; a first subtractor having input terminals connected with an output terminal of the second integrator and an output terminal of the third integrator, respectively; and an analog-to-digital converter (ADC) having input terminals connected with an output terminal of the first integrator and an output terminal of the first subtractor, respectively.

The third electrode and the fourth electrode may be arranged inside the second electrode in a plan view.

The second electrode may be entirely arranged inside the third electrode and the fourth electrode in a plan view.

The touch sensing apparatus may further include a display panel configured to display an image, and the touch panel may be arranged on the display panel.

The first electrode, the second electrode, the third electrode, and the fourth electrode may be arranged at a same layer on a substrate of the display panel.

An exemplary embodiment of the invention discloses a touch panel including: a substrate; a plurality of first touch electrodes disposed on the substrate and extending along a first direction and arranged along a second direction that crosses the first direction; a plurality of second touch electrodes, a plurality of third touch electrodes, and a plurality of fourth touch electrodes disposed on the substrate and arranged along the first direction; a first insulating layer disposed on the first touch electrode, the second touch electrode, and the third touch electrode; and a second insulating layer disposed on the fourth touch electrode. The first insulating layer and the second insulating layer may have different dielectric constants.

One of the second touch electrodes may include first sub-electrodes arranged along the second direction and first connectors which connect between the first sub-electrodes, one of the third touch electrodes may include second sub-electrodes arranged along the second direction and second connectors which connect between the second sub-electrodes, and one of the fourth touch electrodes may include third sub-electrodes arranged along the second direction and third connectors which connect the third sub-electrodes.

The touch panel may further include a third insulating layer disposed between the first touch electrode and the first connector, and between the second connector and the third connector, and the third insulating layer may have a planar H shape.

The second sub-electrode and the third sub-electrode are arranged inside the first sub-electrode in a plan view.

The first sub-electrode may be entirely arranged inside the second sub-electrode and the third sub-electrode in a plan view.

The first sub-electrodes, the second sub-electrodes, and the third sub-electrodes are arranged at a layer that may be different from that of the first connector, the second connector, and the third connector.

The touch panel may further include a window arranged on the first insulating layer and the second insulating layer.

The touch panel may further include: a driver configured to apply a driving signal to the first touch electrode; a touch sensor configured to receive signals transferred from the second touch electrode, the third touch electrode, and the fourth touch electrode, and to output differences between the signals as sensing signals; and a touch controller configured to detect a touch input by using the sensing signal, and the touch sensor may output a signal obtained by subtracting a difference between a second signal transferred from a third touch electrode adjacent to the second touch electrode and a third signal transferred from a fourth touch electrode adjacent to the second touch electrode, as the sensing signal.

An exemplary embodiment of the present invention also discloses a display device including: a display panel configured to display an image; and a touch panel including a first electrode, a second electrode, a third electrode, and a fourth electrode arranged on the display panel, a first insulating layer arranged on the first electrode, the second electrode, and the third electrode, and a second insulating layer arranged on the fourth electrode, and a first material included in the first insulating layer and a second material included in the second insulating layer may have different dielectric constants.

The touch panel may include: a driver configured to apply a driving signal to the first touch electrode; a touch sensor configured to receive signals transferred from the second touch electrode, the third touch electrode, and the fourth touch electrode, and to output differences between the signals as sensing signals; and a touch controller configured to detect a touch input by using the sensing signal.

According to the exemplary embodiments, it is possible to precisely sense a touch input.

According to the exemplary embodiments, it is possible to precisely sense a multi-touch input.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE ILLUSTRATED EMBODIMENTS

Figure 1:
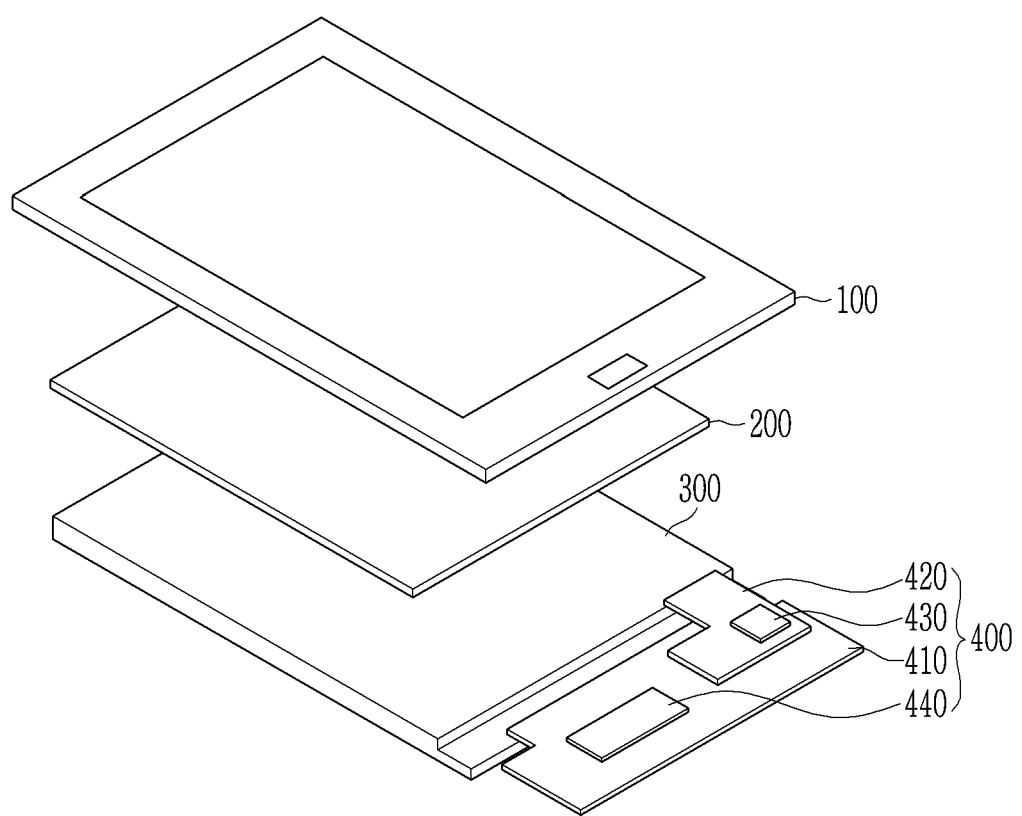
FIG. 1 is an exploded perspective view illustrating a display device according to an exemplary embodiment of the inventive concepts.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The present invention will be described more fully hereinafter with reference to the accompanying drawings, in which exemplary embodiments are shown. As those skilled in the art would realize, the described embodiments may be modified in various ways, all without departing from the spirit or scope of the present invention.

FIG. 1 is an exploded perspective view illustrating a display device according to an exemplary embodiment of the present invention.

As shown in FIG. 1, the display device includes a display panel for displaying an image, and a touch sensing apparatus disposed on the display panel to sense a touch. The touch sensing apparatus may be formed in a separate touch panel to be attached to the display panel (add-on cell type), or may be integrated with the display panel to constitute a touch display panel 300.

The display device includes a driving module 400 for driving the display panel and the touch panel. The driving module 400 includes a flexible circuit board 410 including a driving chip disposed therein for driving the display panel, a connection circuit portion 420 for connecting the flexible circuit board 410 to the display panel, a touch driving chip 430 for driving the touch panel, and a display driving chip 440 for driving the display panel.

The display device may further include a polarizer 200. The polarizer 200 is disposed on the touch display panel 300. The polarizer 200 polarizes light in a direction along a polarization axis. For example, a cell region of the display panel is viewed in black by the polarizer 200.

The display device may further include a window 100. The window 100 is disposed on the polarizer 200. The window 100 corresponds to an upper cover of the display device. The window 100 includes a display area and a light-blocking area arranged to surround the display area.

Figure 2:
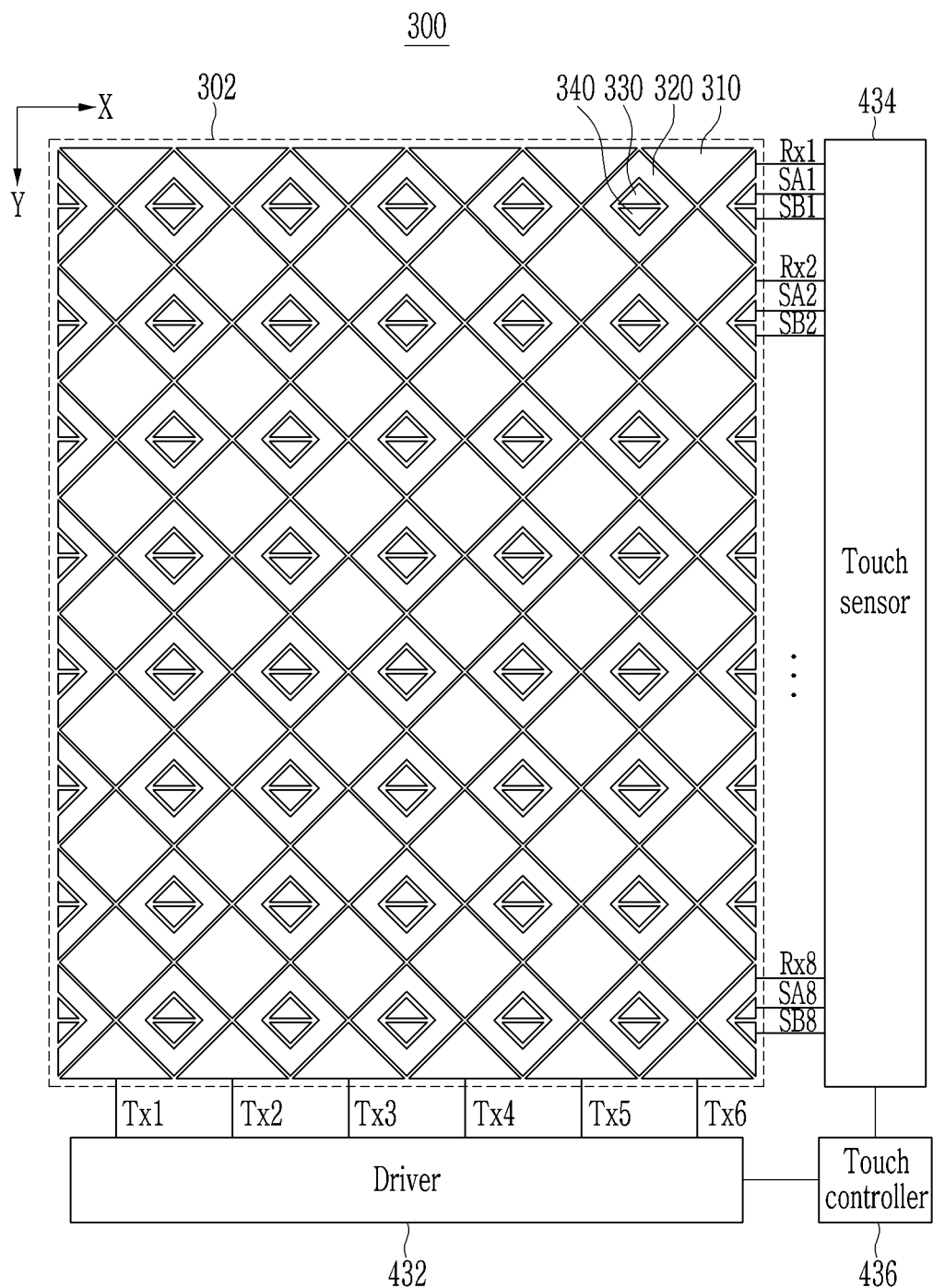
FIG. 2 is a top plan view illustrating a touch sensing apparatus according to an exemplary embodiment.

FIG. 2 is a top plan view illustrating a touch sensing apparatus according to an exemplary embodiment.

As shown in FIG. 2, the touch sensing apparatus includes a substrate 302, and a plurality of touch electrodes 310, 320, 330, and 340 disposed on the substrate 302.

The touch sensing apparatus includes first touch electrodes 310 that extend in a first direction Y, second touch electrodes 320 including a plurality of first sub-electrodes disposed in a second direction X, third touch electrodes 330 including a plurality of second sub-electrodes disposed along the second direction X, and fourth touch electrodes 340 including a plurality of third sub-electrodes disposed in the second direction X.

The first touch electrodes 310 may be connected to first lines Tx1-Tx6. The second touch electrodes 320 may be connected to second lines Rx1-Rx8. The third touch electrodes 330 may be connected to third lines SA1-SA8. The fourth touch electrodes 340 may be connected to fourth lines SB1-SB8.

Although FIG. 2 shows a 6×8 type of touch panel in which there are six input channels Tx1 to Tx6 of the driving signals and eight receiving channels Rx1 to Rx8 of the sensing signals, numbers of the input channels and the receiving channels may be variously modified.

The substrate 302 may be a transparent substrate for forming a plurality of touch electrodes 310, 320, 330, and 340 thereon, and may be made of a plastic material such as PI (polyimide), PET (polyethylene terephthalate), and PC (polycarbonate), or tempered glass.

The touch electrodes 310, 320, 330, and 340 may be provided on one surface or opposite surfaces of the substrate 302. In a case of a touch screen device, the touch electrodes 310, 320, 330, and 340 may be made of ITO (indium tin-oxide), IZO (indium zinc-oxide), ZnO (zinc oxide), CNT (carbon nanotubes), or a graphene-based material, which are transparent and have conductivity. Although FIG. 2 illustrates the touch electrodes 310, 320, 330, and 340 having a rhombic or diamond pattern, the touch electrodes 310, 320, 330, and 340 may have various polygonal patterns, such as a rectangle and a triangle.

The first touch electrodes 310 may be electrically connected to a driver 432 through the first lines Tx1-Tx6. The second to fourth touch electrodes 320, 330, and 340 may be electrically connected to a touch sensor 434 through the second lines Rx1-Rx8, the third lines SA1-SA8n, and the fourth lines SB1-SB8.

The driver 432 may apply driving signals to the first lines Tx1-Tx6. The driving signal may be a square wave, a sine wave, a triangle wave, or the like, which have a predetermined period and amplitude, and may be applied to each of the first lines Tx1 to Tx6.

Although not illustrated in FIG. 2, the touch sensor 434 may include a first integration circuit for outputting a change in charging capacitance between the first touch electrode 310 and the second touch electrode 320 or a change in a charging amount by a contact of a conductor such as a finger or the like as a sensing signal. In addition, the touch sensor 434 may further include a second integration circuit for outputting charges re-transferred from the conductor to the third and fourth touch electrodes 330 and 340 as noise signals.

Figure 5:
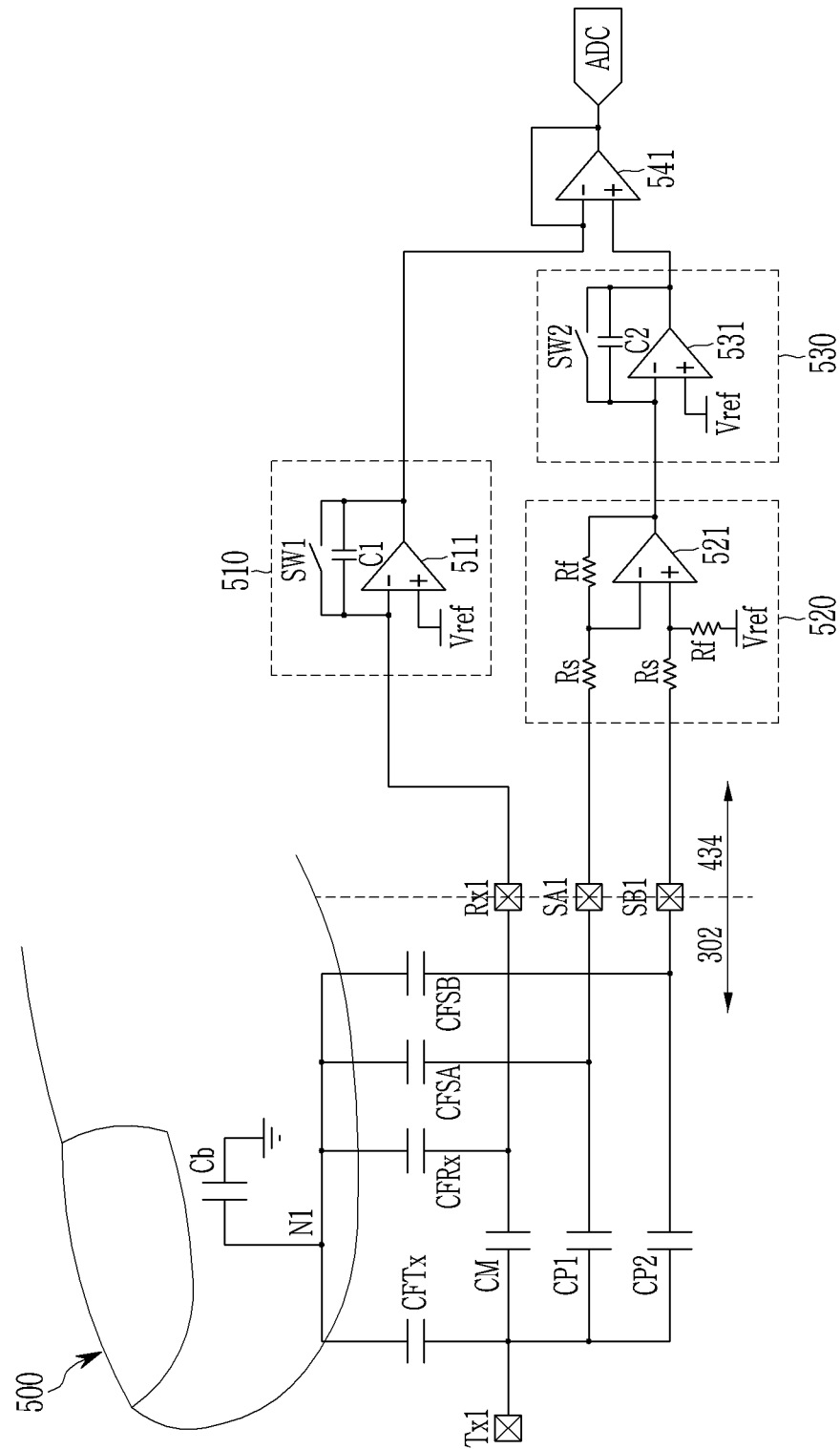
FIG. 5 is a circuit diagram illustrating a touch sensor for removing noise according to an exemplary embodiment.
Figure 6:
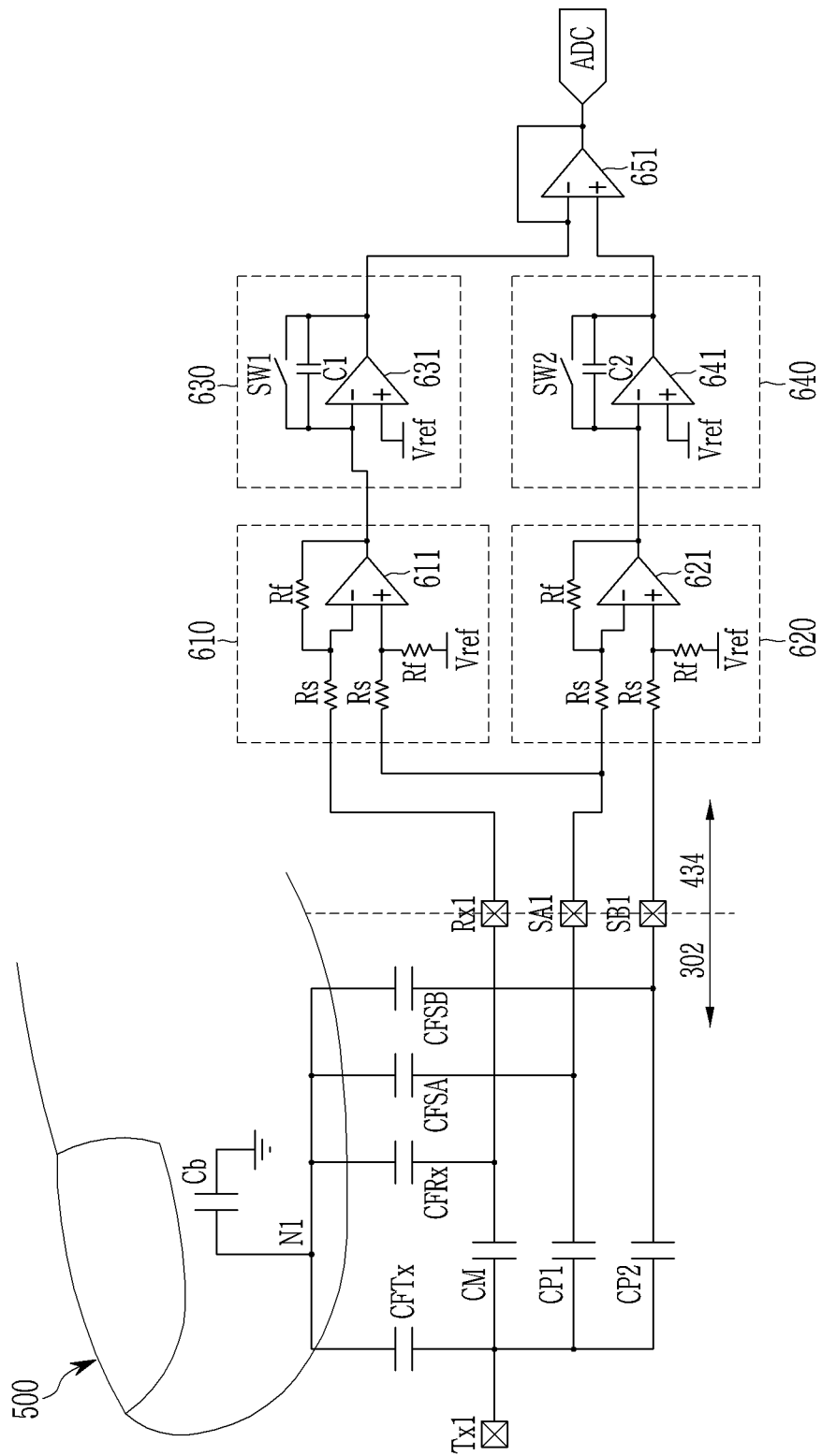
FIG. 6 is a circuit diagram illustrating a touch sensor for removing noise according to an exemplary embodiment.
Figure 7:
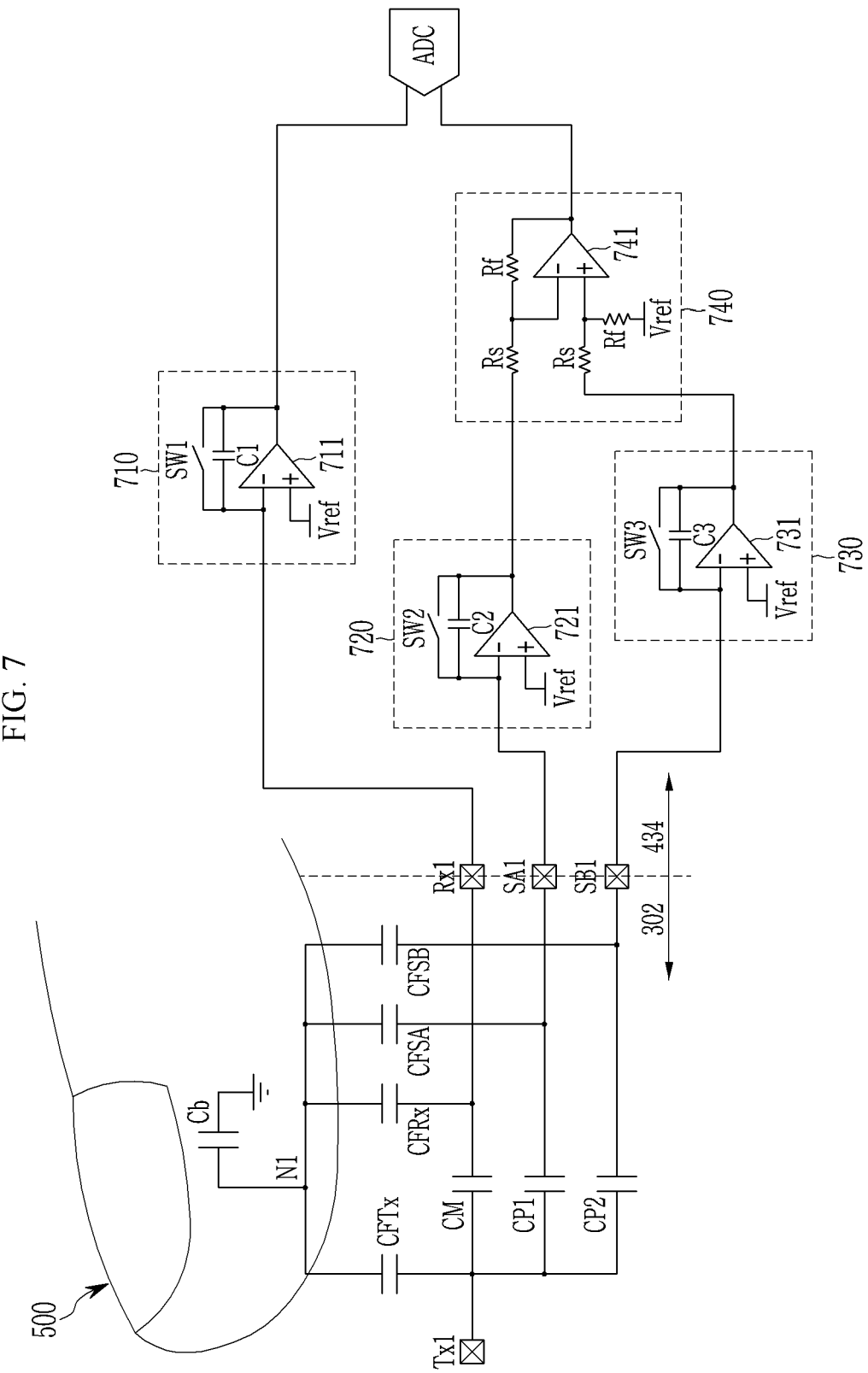
FIG. 7 is a circuit diagram illustrating a touch sensor for removing noise according to an exemplary embodiment.

The touch sensor 434 may further include a signal converter (analog-to-digital converter (ADC) illustrated in FIG. 5 to FIG. 7) for converting a value obtained by subtracting the noise signals from the sensing signal into a digital signal and outputting it to a touch controller 436. In this case, the touch controller 436 may determine whether or not the touch input is performed by using the digital signal outputted from the touch sensor 434.

The touch sensor 434 will be described later in detail with reference to FIG. 5 to FIG. 7.

Next, a touch cell of the touch sensing apparatus will be described in detail with reference to FIG. 3 and FIG. 4.

Figure 3:
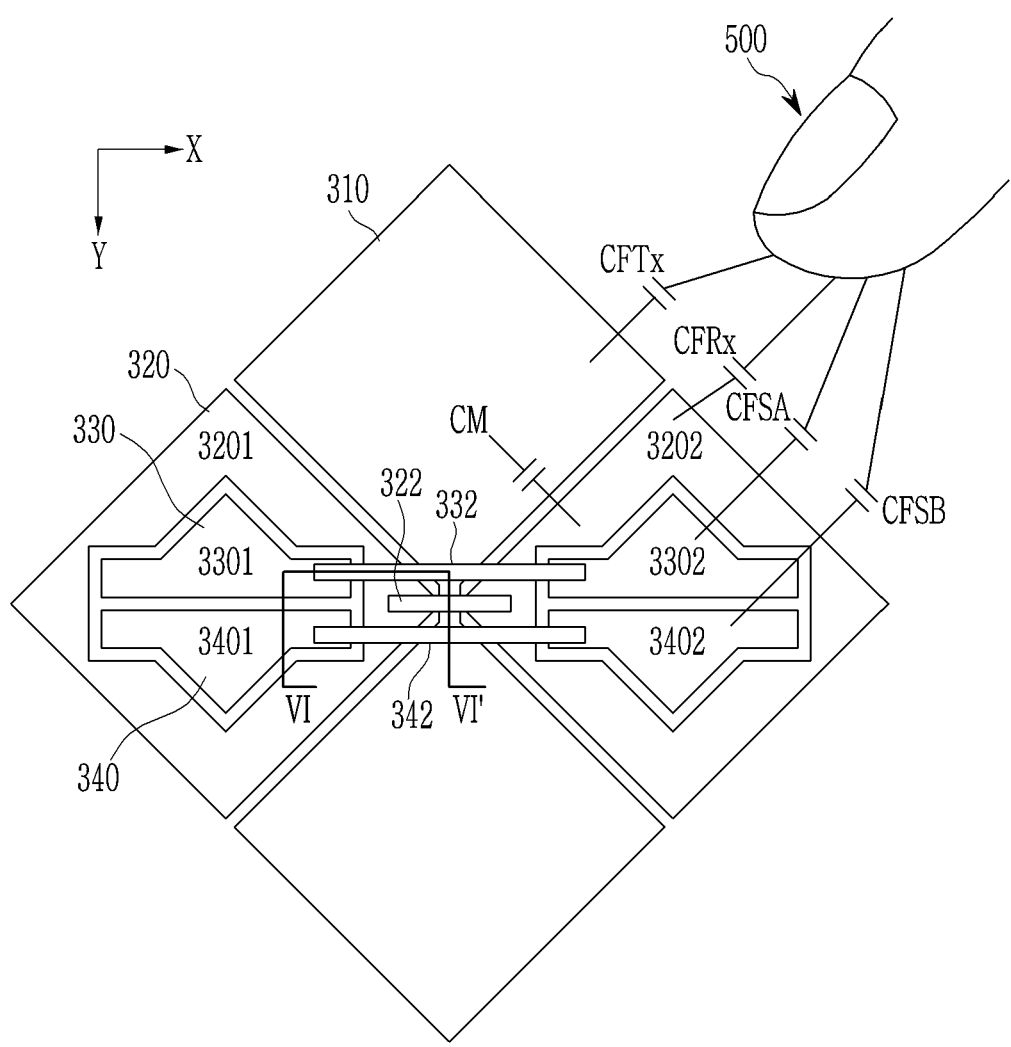
FIG. 3 is a top plan view illustrating a touch cell of a touch sensing apparatus according to an exemplary embodiment.
Figure 4:
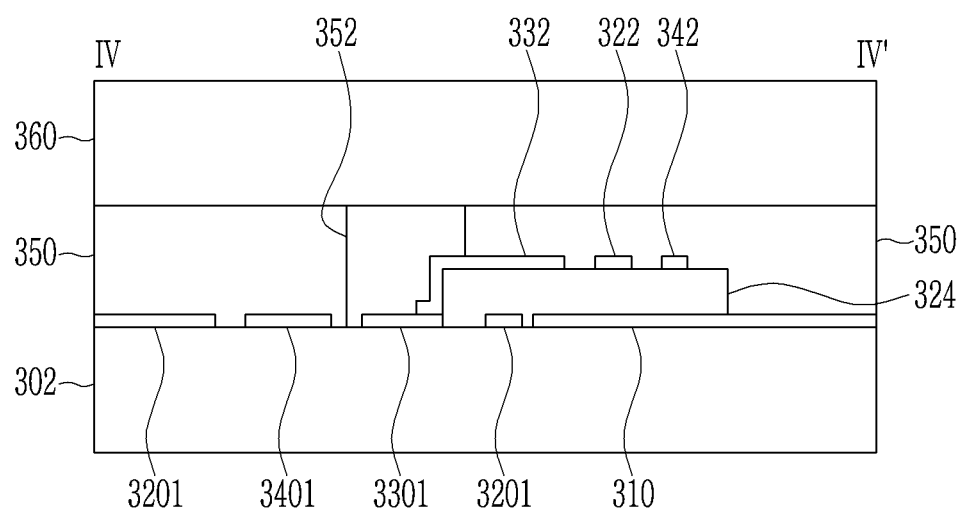
FIG. 4 is a cross-sectional view illustrating a touch cell according to an exemplary embodiment.

FIG. 3 is a top plan view illustrating a touch cell of a touch sensing apparatus according to an exemplary embodiment, and FIG. 4 is a cross-sectional view illustrating a touch cell according to an exemplary embodiment.

As shown in FIG. 3, the first touch electrode 310 may be one electrode that extends in the first direction Y, and the second touch electrode 320 may have a shape in which first sub-electrodes 3201 and 3202 are connected with each other through a connector 322. In addition, the third touch electrode 330 may have a shape in which second sub-electrodes 3301 and 3302 are connected with each other through a connector 332, and the fourth touch electrode 340 may have a shape in which third sub-electrodes 3401 and 3402 are connected with each other through a connector 342.

The connector 322 that connects adjacent first sub-electrodes 3201 and 3202 may be positioned at a layer that is different from that of the first sub-electrodes 3201 and 3202. In other words, the first sub-electrodes 3201 and 3202 and the connector 322 may be separated from each other, and may be separately patterned. The first sub-electrodes 3201 and 3202 and the connector 322 may be connected with each other through direct contact.

A first insulating layer 324, shown in FIG. 4, may be arranged between the connector 322 and the first touch electrode 310 to insulate the connector 322 from the first touch electrode 310. The first insulating layer may include a plurality of independent island-shaped insulators arranged at intersections of the connector 322 and the first touch electrode 310. The first insulating layer 324 may have a planar H shape or a polygonal shape.

The second sub-electrode 3301 and the third sub-electrode 3401 are disposed inside the first sub-electrode 3201. In other words, one first sub-electrode 3201 may have such a shape so as to surround the second sub-electrode 3301 and the third sub-electrode 3401.

The connector 332 that connects adjacent second sub-electrodes 3301 and 3302 may be positioned at a layer that is different from that of the second sub-electrodes 3301 and 3302. In other words, the second sub-electrodes 3301 and 3302 and the connector 332 may be separated from each other, and may be separately patterned. The second sub-electrodes 3301 and 3302 and the connector 332 may be connected with each other through direct contact.

The connector 342 that connects adjacent third sub-electrodes 3401 and 3402 may be positioned at a layer that is different from that of the third sub-electrodes 3401 and 3402. In other words, the third sub-electrodes 3401 and 3402 and the connector 342 may be separated from each other, and may be separately patterned. The third sub-electrodes 3401 and 3402 and the connector 342 may be connected with each other through direct contact.

The first insulating layer 324, shown in FIG. 4, may be arranged between the connectors 332 and 342 and the first touch electrode 310 to insulate the connectors 332 and 342 from the first touch electrode 310.

All of the first touch electrode 310, the second touch electrode 320, the third touch electrode 330, and the fourth touch electrode 340 may be disposed on a first planar surface. All of the connectors 322, 332, and 342 may be disposed on a second planar surface that is different from the first planar surface.

Alternatively, the first touch electrode 310 and the second touch electrode 320 may be disposed together on the first planar surface, the third touch electrode 330 and the fourth touch electrode 340 may be disposed together on the second surface that is different from the first planar surface, and all of the connectors 322, 332, and 342 may be disposed on a third surface that is different from the first and second surfaces.

As shown in FIG. 4, the touch sensing apparatus according to the present exemplary embodiment may be formed directly on the substrate 302 of the display panel.

The substrate 302 may include various plastics, a metal thin film, ultra-thin glass, or the like. The substrate 302 may include at least one plastic film. For example, the plastic film may include polyethylene terephthalate (PET), polyethylene naphthalate (PEN), polyimide (PI), polycarbonate (PC), poly(methyl methacrylate) (PMMA), polyarylate (PAR), polyether imide (PEI), polyether sulfone (PES), cellulose triacetate (TAC), or the like.

In the present exemplary embodiment, although the touch sensing apparatus has been described as being formed directly on the substrate 302, the touch sensing apparatus may be adhered to the substrate 302. In this case, an adhesive layer for adhering the touch sensing apparatus to the substrate 302 may be formed of a transparent adhesive material having high light transmittance, and for example, may be formed of a super view resin (SVR), an optically clear adhesive (OCA) film, etc.

The electrodes 310, 3201, 3301, 3401, and 3202 may be positioned on the substrate 302. In the exemplary embodiment of FIG. 4, the first touch electrode 310, the first sub-electrodes 3201 and 3202, the second sub-electrode 3301, and the third sub-electrode 3401 may be positioned at a same layer, and may be formed by using a same material. The connectors 322, 332, and 342 may be positioned at a layer that is different from that of the electrodes 310, 3201, 3301, 3401, and 3202, and the connectors 322, 332, and 342 may be formed by using a same material.

The electrodes 310, 3201, 3301, 3401, and 3202 and the connectors 322, 332, and 342 may be formed of a transparent conductive material including ITO (indium tin oxide), IZO (indium zinc oxide), a thin metal layer such as a silver nanowire (AgNW), a metal mesh, or carbon nanotubes (CNT), but the inventive concepts are not limited thereto.

The first insulating layers 324 are arranged between the connectors 322, 332, and 342 and the electrodes 310, 3201, 3301, 3401, and 3202 to insulate therebetween.

A second insulating layer 350 is arranged on the electrodes 310, 3201, 3401, and 3202, and a third insulating layer 352 is arranged on the electrode 3301. The second insulating layer 350 and the third insulating layer 352 may have different dielectric constants. A capacitance of a capacitor CFSA generated between the second insulating layer 350 and the third insulating layer 352 is different from a capacitance of a capacitor CFSB generated between a conductor 500 and the third sub-electrode 3402 by such difference between the dielectric constants.

The first to third insulating layers 324, 350, and 352 are formed of an organic insulator or an inorganic insulator made of a transparent material. The organic insulator is formed of a plastic material such as PET (polyethylene terephthalate), PEN (polyethylene naphthalate), PI (polyimide), PC (polycarbonate), PMMA (polymethylmethacrylate), PAR (polyarylate), PEI (polyether imide), PES (polyether sulfone), or TAC (cellulose triacetate), and the inorganic insulator is formed of a glass material or an optical grade glass material.

One selected from processes of depositing SiO2, laminating an acryl-based dry film, coating a liquid type of silicone or epoxy, and depositing a transparent insulating material, such as SiO2 or TiO2, may be selected to form the first to third insulating layer 324, 350, and 352.

When being formed of the liquid type of silicone or epoxy material, the first to third insulating layers 324, 350, and 352 may be formed by using one selected from direct gravure coating, reverse gravure coating, micro-gravure coating, comma coating, slot die coating, slit coating, curtain coating, capillary coating, spray coating, dip coating, silk screening, spin coating, flexographic printing, gravure printing, inkjet printing, and offset printing methods.

A cover window 360 may be arranged on the insulating layers 350 and 352. The cover window 360 made of transparent glass, polyimide (PI), polyethylene terephthalate (PET), or the like.

Hereinafter, a touch cell and the touch sensor 434 will be described in detail with reference to FIG. 5 to FIG. 7.

FIG. 5 is a circuit diagram illustrating a touch sensor for removing noise according to an exemplary embodiment.

As shown in FIG. 5, a capacitance of a capacitor CM is generated between the first touch electrode and the second touch electrode. A capacitance of a capacitor CP1 is generated between the first touch electrode and the third touch electrode, and a capacitance of a capacitor CP2 is generated between the first touch electrode and the fourth touch electrode.

When no touch input is performed, a driving signal inputted through the first line Tx1 is transferred to the second line Rx1, the third line SA1, and the fourth line SB1 through the capacitor CM, the capacitor CP1, and the capacitor CP2, respectively.

When the conductor 500 approaches touch electrodes (i.e., a touch input is performed), most of the charges of driving signals inputted through the first line Tx1 are sunk to a ground level through a capacitor CFTx and a capacitor Cb of the conductor 500. When no touch input is performed, a smaller magnitude of the signal is transferred to the second line Rx1 as compared with the signal transferred to the second line Rx1. Accordingly, the touch controller 436 may determine whether or not a touch input is performed by using the magnitude of the signal transferred to the second line Rx1.

As the window 100 is reduced in thickness, capacitances of capacitors CFTx, CFRx, CFSA, and CFSB are further generated between the conductor 500 and the touch electrodes, and values of the capacitances of the capacitors CFTx, CFRx, CFSA, and CFSB are increased.

In this case, when the conductor 500 approaches the touch electrodes, some of the charges of the driving signal inputted through the first line Tx1 are further transferred to the second line Rx1 through the capacitor CFTx and the capacitor CFRx. When the driving signal is inputted through the first line Tx1, a magnitude of a signal transferred to the second line Rx1 is increased.

Since the magnitude of the signal transferred to the second line Rx when a touch input is performed is not different from the signal transferred to the second line Rx1 when no touch input is performed, the touch controller 436 may determine that no touch input is performed. In other words, as the window 100 is reduced in thickness, the magnitude of the signal transferred to the second line Rx1 may be increased by the capacitance of the capacitor CFRx generated between the conductor 500 and the touch electrodes, thereby making it difficult to precisely detect the touch input.

According to the present exemplary embodiment, some of the charges of the driving signal inputted through the first line Tx1 are also transferred to the third line SA1 through the capacitor CFTx and the capacitor CFSA, and some of the charges of the driving signal inputted through the first line Tx1 are also transferred to the fourth line SB1 through the capacitor CFTx and the capacitor CFSB.

Since a dielectric constant of a dielectric layer disposed on the third touch electrode is different from that of a dielectric layer disposed on the fourth touch electrode, the capacitance of the capacitor CFSA is different from the capacitance of the capacitor CFSB. A magnitude of the signal transferred to the third line SA1 is different from that of the signal transferred to the fourth line SB1 by the different capacitances of the capacitors CFSA and CFSB.

Specifically, the reason that the magnitude of the signal transferred to the third line SA1 is different from that of the signal transferred to the fourth line SB1 is that charges are transferred from the conductor 500 toward the touch electrodes.

When the magnitude of the signal transferred to the third line SA1 is identical to that of the signal transferred to the fourth line SB1, the two signals may be noise introduced through the display panel disposed below the touch panel.

The touch sensor 434 may estimate a noise signal depending on charges introduced from the conductor 500 by using the point that two signals have different magnitudes. In addition, the touch sensor 434 may obtain an abnormal sensing signal by subtracting a noise signal from a sensing signal outputted from the second touch electrode.

The touch sensor 434 may include integrators 510 and 530 and subtractors 520 and 541. The integrators 510 and 530 may include at least one operational amplifier and a capacitor having a predetermined capacitance. In detail, the integrator 510 may include an operational amplifier 511, a switch SW1, and a capacitor C1. The integrator 530 may include an operational amplifier 531, a switch SW2, and a capacitor C2.

The integrator 510 may output a change in charging capacitance or a change in a charging amount as a voltage signal by connecting an inverting input terminal of the operational amplifier 511 to the second line Rx1.

The subtractor 520 may include an operational amplifier 521 and resistors Rs and Rf. Each magnitude of the resistors Rs and Rf included in the subtractor 520 may be modified in consideration of an area of the first sub-electrode 3201, an area of the second sub-electrode 3301, an area of the third sub-electrode 3401, magnitudes of the capacitances of the capacitors CFRx, CFSA, and CFSB, and the like.

For example, when both an area ratio of the first sub-electrode 3201 and the second sub-electrode 3301 and an area ratio of the first sub-electrode 3201 and the sub-electrode 3401 are 8:1, a magnitude ratio of the resistors Rf and Rs may also be 8:1.

The second line Rx1 connected with the second touch electrode 320 may be connected to an input terminal of the integrator 510. The integrator 510 integrates and outputs the signal inputted through the second line Rx1.

The third line SA1 connected with the third touch electrode 330 and the fourth line SB1 connected with the fourth touch electrode 340 may be respectively connected to input terminals of the subtractor 520. The subtractor 520 subtracts the signal inputted through the third line SA1 from the signal inputted through the fourth line SB1, and amplifies and outputs the subtracted signal depending on values of the resistors Rf and Rs.

An output signal of the subtractor 520 may be inputted into the integrator 530. The integrator 530 integrates and outputs an output signal of the subtractor 520.

Output signals of the integrator 510 and the integrator 530 may be inputted into input terminals of the subtractor 541. The subtractor 541 subtracts the output signal of the integrator 530 from the output signal of the integrator 510, and outputs the subtracted signal to the ADC. The outputted signal is converted into a digital signal through the ADC to be transferred to the touch controller 436.

As described above, when a touch is performed, a signal transferred to the third touch electrode and a signal transferred to the fourth touch electrode may have different magnitudes. The subtractor 520 may subtract the signal transferred to the third touch electrode and the signal transferred to the fourth touch electrode to amplify the signals. The amplified signals are integrated through the integrator 530. The signal transferred to the second touch electrode is integrated through the integrator 510. Since the signal integrated through the integrator 530 is subtracted from the signal integrated through the integrator 510, a normal signal from which noise is removed may be outputted to the ADC.

FIG. 6 is a circuit diagram illustrating a touch sensor for removing noise according to an exemplary embodiment.

As shown in FIG. 6, the touch sensor 434 may include integrators 630 and 640 and subtractors 610, 620, and 651. The integrators 630 and 640 may include at least one operational amplifier and a capacitor having a predetermined capacitance. In detail, the integrator 630 may include an operational amplifier 631, a switch SW1, and a capacitor C1. The integrator 640 may include an operational amplifier 641, a switch SW2, and a capacitor C2.

The subtractor 610 may include an operational amplifier 611 and resistors Rs and Rf. The subtractor 620 may include an operational amplifier 621 and resistors Rs and Rf.

Each magnitude of the resistors Rs and Rf included in the subtractors 610 and 620 may be modified in consideration of an area of the first sub-electrode 3201, an area of the second sub-electrode 3301, an area of the third sub-electrode 3401, magnitudes of the capacitances of the capacitors CFRx, CFSA, and CFSB, and the like.

The second line Rx1 connected with the second touch electrode 320 and the third line SA1 connected with the third touch electrode 330 may be connected to an input terminal of the subtractor 610.

The subtractor 610 amplifies the signal inputted through the third line SA1 depending on the values of the resistors Rf and Rs, and subtracts the signal inputted through the second line Rx1 from the amplified signal to output it. An amplification factor of the signal inputted through the third line SA1 may be modified depending on each magnitude of the resistors Rs and Rf included in the subtractor 610, and each magnitude of the resistors Rs and Rf may be modified depending on an area of the first sub-electrode 3201, an area of the second sub-electrode 3301, and magnitudes of the capacitances of the capacitors CFRx and CFSA.

An output signal of the subtractor 610 may be inputted into the integrator 630. The integrator 630 integrates and outputs two signals subtracted by the subtractor 610.

The third line SA1 connected with the third touch electrode 330 and the fourth line SB1 connected with the fourth touch electrode 340 may be respectively connected to input terminals of the subtractor 620. The subtractor 620 subtracts the signal inputted through the third line SA1 from the signal inputted through the fourth line SB1, and amplifies and outputs the subtracted signal depending on values of the resistors Rf and Rs.

An output signal of the subtractor 620 may be inputted into the integrator 640. The integrator 640 integrates and outputs an output signal of the subtractor 620.

Output signals of the integrator 630 and the integrator 640 may be inputted into input terminals of the subtractor 651. The subtractor 651 subtracts the output signal of the integrator 630 from the output signal of the integrator 640, and outputs the subtracted signal to the ADC. The outputted signal is converted into a digital signal through the ADC to be transferred to the touch controller 436.

As described above, when a touch is performed, a signal transferred to the third touch electrode and a signal transferred to the fourth touch electrode may have different magnitudes. The subtractor 620 may subtract the signal transferred to the third touch electrode and the signal transferred to the fourth touch electrode to amplify the signals. The amplified signals are integrated through the integrator 640. The subtractor 610 subtracts the signal transferred to the second touch electrode and the signal transferred to the third touch electrode. Accordingly, noise introduced from the signal transferred to the second touch electrode through the display panel disposed below the touch panel may be removed. The signal outputted from the subtractor 610 is integrated through the integrator 630. Since the signal integrated through the integrator 640 is subtracted from the signal integrated through the integrator 630, a normal signal from which noise caused by charges re-transferred to the touch electrode in the touch input and noise introduced through the display panel are removed may be outputted to the ADC.

FIG. 7 is a circuit diagram illustrating a touch sensor for removing noises according to an exemplary embodiment.

As shown in FIG. 7, the touch sensor 434 may include integrators 710, 720, and 730 and a subtractor 740. The integrators 710, 720, and 730 may include at least one operational amplifier and a capacitor having a predetermined capacitance. In detail, the integrator 730 may include an operational amplifier 731, a switch SW1, and a capacitor C1. The integrator 740 may include an operational amplifier 741, a switch SW2, and a capacitor C2.

The integrator 710 may output a change in charging capacitance or a change in a charging amount as a voltage signal to a differential ADC by connecting an inverting input terminal of an operational amplifier 711 to the second line Rx1.

An operational amplifier 721 of the integrator 720 may be connected with the third line SA1. The integrator 720 integrates the signal inputted through the third line SA1 and outputs it as a voltage signal.

The operational amplifier 731 of the integrator 730 may be connected with the fourth line SB1. The integrator 730 amplifies the signal inputted through the fourth line SB1 and outputs it as a voltage signal.

The subtractor 740 may include the operational amplifier 741 and resistors Rs and Rf. Each magnitude of the resistors Rs and Rf included in the subtractor 740 may be modified in consideration of an area of the first sub-electrode 3201, an area of the second sub-electrode 3301, an area of the third sub-electrode 3401, magnitudes of the capacitances of the capacitors CFRx, CFSA, and CFSB, and the like.

Output terminals of the integrator 720 and the integrator 730 may be connected to an input terminal of the subtractor 740. Output signals of the integrator 720 and the integrator 730 may be inputted into input terminals of the subtractor 740.

The subtractor 740 subtracts the output signal of the integrator 720 from the output signal of the integrator 730, and outputs the subtracted signal to the differential ADC.

The differential ADC converts a difference between output signals of the integrator 710 and the subtractor 740 into a digital signal to output it to the touch controller 436.

As described above, when a touch is performed, a signal transferred to the third touch electrode and a signal transferred to the fourth touch electrode may have different magnitudes. The subtractor 740 subtracts the signal transferred to the third touch electrode to be integrated and the signal transferred to the fourth touch electrode to be integrated, and amplifies the subtracted signals. The signal transferred to the second touch electrode is integrated through the integrator 710. Output signals of the subtractor 740 and the integrator 710 are transferred to the differential ADC, and the differential ADC outputs a difference between the two signals as a digital signal to the touch controller 436. Accordingly, a normal signal from which noise is removed may be outputted to the touch controller 436.

Next, a structure of a touch cell according to another exemplary embodiment will be described with reference to FIG. 8.

Figure 8:
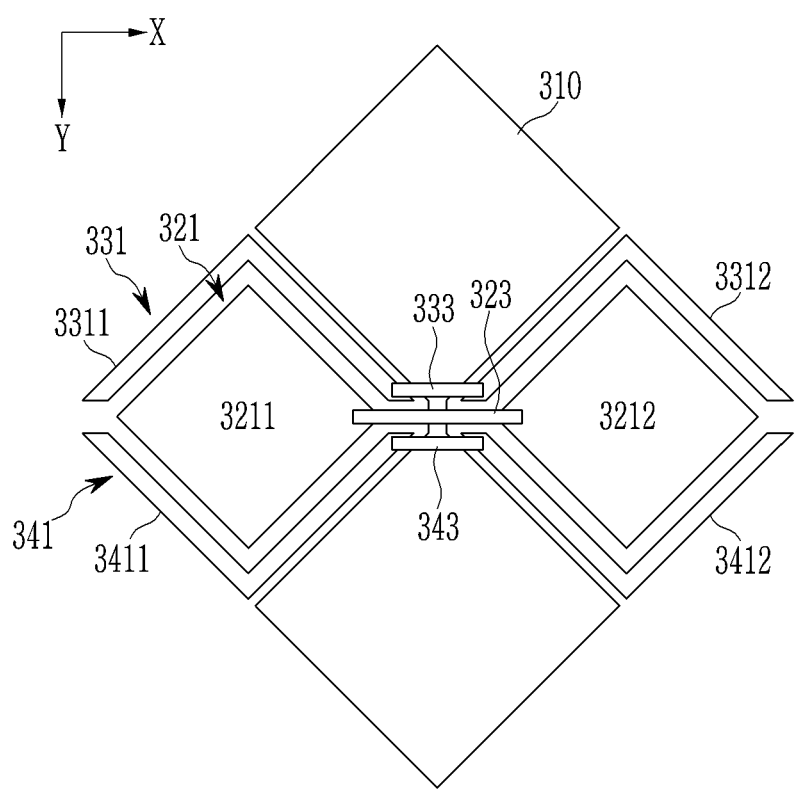
FIG. 8 is a top plan view illustrating a touch cell of a touch sensing apparatus according to another exemplary embodiment.

FIG. 8 is a top plan view illustrating a touch cell of a touch sensing apparatus according to another exemplary embodiment. As shown in FIG. 8, a first touch electrode 310 may be one electrode that extends in the first direction Y, and a second touch electrode 321 may have a shape in which first sub-electrodes 3211 and 3212 are connected with each other through a connector 323. In addition, a third touch electrode 331 may have a shape in which second sub-electrodes 3311 and 3312 are connected with each other through a connector 333, and a fourth touch electrode 341 may have a shape in which third sub-electrodes 3411 and 3412 are connected with each other through a connector 343.

The connector 323 that connects the adjacent first sub-electrodes 3211 and 3212 may be positioned at a layer that is different from that of the first sub-electrodes 3211 and 3212. In other words, the first sub-electrodes 3211 and 3212 and the connector 323 may be separate from each other, and may be separately patterned. The first sub-electrodes 3211 and 3212 and the connector 323 may be connected with each other through direct contact.

An insulating layer (not illustrated) may be arranged between the connector 323 and the first touch electrode 310 to insulate the connector 323 from the first touch electrode 310. The insulating layer may include a plurality of independent island-shaped insulators positioned at intersections of the connector 323 and the first touch electrode 310. The insulating layer may have a planar H shape or a polygonal shape.

The second sub-electrode 3311 and the third sub-electrode 3411 are disposed outside the first sub-electrode 3211. In addition, the second sub-electrode 3312 and the third sub-electrode 3412 are disposed outside the first sub-electrode 3212. In other words, the second sub-electrode 3311 and the third sub-electrode 3411 may have such a shape so as to surround one first sub-electrode 3211.

The connector 333 that connects the adjacent second sub-electrodes 3311 and 3312 may be positioned at a layer that is different from that of the second sub-electrodes 3311 and 3312. In other words, the second sub-electrodes 3311 and 3312 and the connector 333 may be separate from each other, and may be separately patterned. The second sub-electrodes 3311 and 3312 and the connector 333 may be connected with each other through direct contact.

The connector 343 that connects the adjacent third sub-electrodes 3411 and 3412 may be positioned at a layer that is different from that of the third sub-electrodes 3411 and 3412. In other words, the third sub-electrodes 3411 and 3412 and the connector 343 may be different from each other, and may be separately patterned. The third sub-electrodes 3411 and 3412 and the connector 343 may be connected with each other through direct contact.

A first insulating layer (not illustrated) may be arranged between the connectors 333 and 343 and the first touch electrode 310 to insulate the connectors 333 and 343 from the first touch electrode 310.

All of the first touch electrode 310, the second touch electrode 321, the third touch electrode 331, and the fourth touch electrode 341 may be disposed on a first planar surface. All of the connectors 323, 333, and 343 may be disposed on a second planar surface that is different from the first planar surface.

Alternatively, the first touch electrode 310 and the second touch electrode 321 may be disposed together on the first planar surface, the third touch electrode 331 and the fourth touch electrode 341 may be disposed together on the second surface that is different from the first planar surface, and all of the connectors 323, 333, and 343 may be disposed on a third surface that is different from the first and second surfaces.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensing apparatus comprising:
   a touch panel including a first electrode and a second electrode;
   a driver configured to apply a driving signal to the first electrode;
   a touch sensor configured to receive a transferred signal depending on the driving signal from the second electrode, and to convert and output the signal as a sensing signal; and
   a touch controller configured to detect the sensing signal,
   wherein:
   the touch panel further includes a third electrode and a fourth electrode which transfer noise signals having different magnitudes to the touch sensor; and
   the touch sensor is configured to output the sensing signal by using a difference in the noise signals and the transferred signal,
   wherein the third electrode and the fourth electrode are arranged inside the second electrode in a plan view.

2. The touch sensing apparatus of claim 1, wherein the touch sensor includes:
   a first integrator having an input terminal connected with the second electrode;
   a first subtractor having input terminals connected with the third electrode and the fourth electrode, respectively;
   a second integrator having an input terminal connected with an output terminal of the first subtractor;
   a second subtractor having input terminals connected with an output terminal of the first integrator and an output terminal of the second integrator, respectively; and
   an analog-to-digital converter (ADC) connected with an output terminal of the second subtractor.

3. The touch sensing apparatus of claim 2, wherein the first subtractor is configured to amplify a difference between the magnitudes of the noise signals to output the noise signals.

4. The touch sensing apparatus of claim 3, wherein an amplification factor for amplifying the difference between the magnitudes of the noise signals is determined depending on an area of the second electrode, an area of the third electrode, and an area of the fourth electrode.

5. The touch sensing apparatus of claim 2, wherein a different input terminal of the first integrator is connected with the third electrode or the fourth electrode.

6. The touch sensing apparatus of claim 1, wherein the touch sensor includes:
   a first integrator having an input terminal connected with the second electrode;
   a second integrator having an input terminal connected with the third electrode;
   a third integrator having an input terminal connected with the fourth electrode;
   a first subtractor having input terminals connected with an output terminal of the second integrator and an output terminal of the third integrator, respectively; and
   an analog-to-digital converter (ADC) having input terminals connected with an output terminal of the first integrator and an output terminal of the first subtractor, respectively.

7. The touch sensing apparatus of claim 1, further comprising a display panel configured to display an image,
   wherein the touch panel is arranged on the display panel.

8. The touch sensing apparatus of claim 7, wherein the first electrode, the second electrode, the third electrode, and the fourth electrode are positioned at a same layer on a substrate of the display panel.

9. A touch panel comprising:
   a substrate;
   a plurality of first touch electrodes disposed on the substrate to extend along a first direction and arranged along a second direction that crosses the first direction;
   a plurality of second touch electrodes, a plurality of third touch electrodes, and a plurality of fourth touch electrodes positioned on the substrate to be arranged along the first direction;
   a first insulating layer disposed on the first touch electrode, the second touch electrode, and the third touch electrode; and
   a second insulating layer disposed on the fourth touch electrode,
   wherein the first insulating layer and the second insulating layer have different dielectric constants.

10. The touch panel of claim 9, wherein:
    one of the second touch electrodes comprises first sub-electrodes arranged along the second direction and first connectors which connect between the first sub-electrodes;
    one of the third touch electrodes comprises second sub-electrodes arranged along the second direction and second connectors which connect between the second sub-electrodes; and
    one of the fourth touch electrodes comprises third sub-electrodes arranged along the second direction and third connectors which connect the third sub-electrodes.

11. The touch panel of claim 10, further comprising a third insulating layer disposed between the first touch electrode and the first connector, and between the second connector and the third connector,
    wherein the third insulating layer has a planar H shape.

12. The touch panel of claim 10, wherein the second sub-electrode and the third sub-electrode are arranged inside the first sub-electrode in a plan view.

13. The touch panel of claim 10, wherein the first sub-electrode is entirely arranged inside the second sub-electrode and the third sub-electrode in a plan view.

14. The touch panel of claim 10, wherein the first sub-electrodes, the second sub-electrodes, and the third sub-electrodes are positioned at a layer that is different from that of the first connector, the second connector, and the third connector.

15. The touch panel of claim 9, further comprising a window arranged on the first insulating layer and the second insulating layer.

16. The touch panel of claim 10, further comprising:

a driver configured to apply a driving signal to the first touch electrode;

a touch sensor configured to receive signals transferred from the second touch electrode, the third touch electrode, and the fourth touch electrode, and to output differences between the signals as sensing signals; and a touch controller configured to detect a touch input by using the sensing signal, wherein the touch sensor is configured to output a signal obtained by subtracting a difference between a second signal transferred from a third touch electrode adjacent to the second touch electrode and a third signal transferred from a fourth touch electrode adjacent to the second touch electrode, as the sensing signal.

17. A display device comprising:

a display panel configured to display an image; and a touch panel including a first electrode, a second electrode, a third electrode, and a fourth electrode arranged on the display panel, a first insulating layer disposed on the first electrode, the second electrode, and the third electrode, and a second insulating layer disposed on the fourth electrode, wherein a first material included in the first insulating layer and a second material included in the second insulating layer have different dielectric constants.

18. The display device of claim 17, wherein the touch panel comprises:

a driver configured to apply a driving signal to the first touch electrode;

a touch sensor configured to receive signals transferred from the second touch electrode, the third touch electrode, and the fourth touch electrode, and to output differences between the signals as sensing signals; and a touch controller configured to detect a touch input by using the sensing signal.

* * * * *